US007871321B2

(12) United States Patent
Hofmann

(10) Patent No.: US 7,871,321 B2
(45) Date of Patent: Jan. 18, 2011

(54) DANCING GUIDE FLOOR USING LED MATRIX DISPLAYS

(75) Inventor: Bernd Hofmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 507 days.

(21) Appl. No.: 11/720,631

(22) PCT Filed: Dec. 1, 2005

(86) PCT No.: PCT/IB2005/054001

§ 371 (c)(1),
(2), (4) Date: Jun. 1, 2007

(87) PCT Pub. No.: WO2006/061746

PCT Pub. Date: Jun. 15, 2006

(65) Prior Publication Data

US 2009/0167213 A1 Jul. 2, 2009

(30) Foreign Application Priority Data

Dec. 6, 2004 (EP) .................................. 04106333

(51) Int. Cl.
*A63F 13/00* (2006.01)

(52) U.S. Cl. ................................ 463/7; 463/31; 463/36

(58) Field of Classification Search ................. 219/413, 219/448.12, 483, 494, 497, 501, 505, 506, 219/549, 705, 707, 720; 340/309.7, 323 R, 340/384.1, 426.25, 459, 5.72, 500, 506, 517, 340/518, 521, 528, 539.1, 541, 573.1, 604, 340/609, 689, 692, 825.19, 870.37; 600/479, 600/483, 484, 485, 502, 503, 513, 519, 523, 600/538, 544, 549; 345/1.1, 102, 156, 157, 345/163, 167, 168, 169, 173, 179, 2.1, 213, 345/418, 419, 420, 440, 467, 473, 475, 501, 345/502, 530, 581, 594, 601, 660, 684, 904; 348/476, 552, 553, 569, 686, 725, 732, 734, 348/838, E17.004, E17.005, E5.056, E5.096, 348/E5.097; 463/7, 31, 36

See application file for complete search history.

(56) References Cited

U.S. PATENT DOCUMENTS

| | | | | |
|---|---|---|---|---|
| 2,605,557 | A * | 8/1952 | Van Deventer | 434/250 |
| 3,233,341 | A * | 2/1966 | Exton, Jr. | 434/250 |
| 5,095,412 | A * | 3/1992 | French | 362/153 |
| 5,130,909 | A | 7/1992 | Gross | |
| 6,227,968 | B1 * | 5/2001 | Suzuki et al. | 463/7 |
| 6,554,706 | B2 * | 4/2003 | Kim et al. | 463/36 |
| 7,122,751 | B1 * | 10/2006 | Anderson et al. | 200/85 R |
| 2004/0160336 | A1 | 8/2004 | Hoch et al. | |

FOREIGN PATENT DOCUMENTS

| | | | |
|---|---|---|---|
| DE | 19646074 | A1 | 5/1998 |
| GB | 2199176 | A | 6/1988 |
| JP | 2004295059 | A | 10/2004 |
| WO | WO03091974 | A1 | 11/2003 |
| WO | WO2004068452 | A2 | 8/2004 |

* cited by examiner

*Primary Examiner*—Douglas W Owens
*Assistant Examiner*—Jae K Kim

(57) ABSTRACT

The present inventions concerns a display system (2) for displaying multiplex information, whereby an individual selection of information is individually addressed to a different user or user groups, whereby the display system for displaying multiplex information comprises at least one display panel of a plurality of light emitting dot-like means and a plurality of sensors (6*a*, 6*b*), whereby a user or user groups are located by sensor so that individual information can be individually addressed depending on the position of each sensor-located user or user groups.

5 Claims, 2 Drawing Sheets

DANCING GUIDE FLOOR USING LED MATRIX DISPLAYS

CROSS REFERENCE TO RELATED APPLICATIONS

This application is a national stage application and claims benefit of and priority under 35 U.S.C §119 to PCT/IB2005/054001 filed Dec. 1, 2005 which claims priority to and benefit from European Patent Application 04106333.0 filed Dec. 6, 2004.

BACKGROUND OF THE INVENTION

1. Field of the Invention

The present invention is generally directed at a display system for displaying multiplex information, whereby an individual selection of information is individually addressed to a different user or user groups. Further, the present invention is directed at the use of said display system and at a process to simultaneously and individually address individual information with a display system. In particular, the present invention is directed at a dancing guide floor using LED matrix displays (LED: light emitting diode).

2. Description of the Related Art

LED matrix displays are widely known in prior art. For example LED dot matrix displays are used in sport stadiums to display information about the game to the spectators.

U.S. Pat. No. 5,130,909 discloses an emergency aid, in the form of a lighting strip arranged along the floor of a predetermined escape route, which is provided for guiding the escape of occupants from a confined area during conditions of severely reduced visibility. The strip comprises a plurality of spaced light-emitting elements, each being an LED emitting a beam having an axial intensity of at least 0.12 candela and a full cone angle of no greater than 24 degrees. Each element includes an external reflector, in the form of a spaced prism or a metal reflector mounted on the element, located along its beam axis and angled with respect thereto for deflecting the emitted light at a predetermined angle. In one embodiment the elements are arranged in pairs facing each other with their beam axes parallel to the axis of the strip and their reflectors between them. The reflectors are arranged to emit light in two predetermined directions relative to the axis, preferably along the floor to illuminate it, and vertically to mark the path to escaping occupants. In another embodiment the elements are arranged in a single direction and can have metal reflectors mounted on the elements. If the strip is mounted at the juncture of a wall and the floor, the reflectors angle alternate beams horizontally and outward at a 45° angle.

However, LED matrix displays as used in prior art do not address individual information to a user or user groups depending on their positions. Furthermore, LED matrix displays systems are not known which can simultaneously address individual information to a user or user groups depending on their position, whereby the information tracks the addressed user or user group if moved.

Therefore, there is a need in prior art to provide a more advanced display system for displaying multiplex information to a user or user groups.

BRIEF SUMMARY OF THE INVENTION

Figure 1:
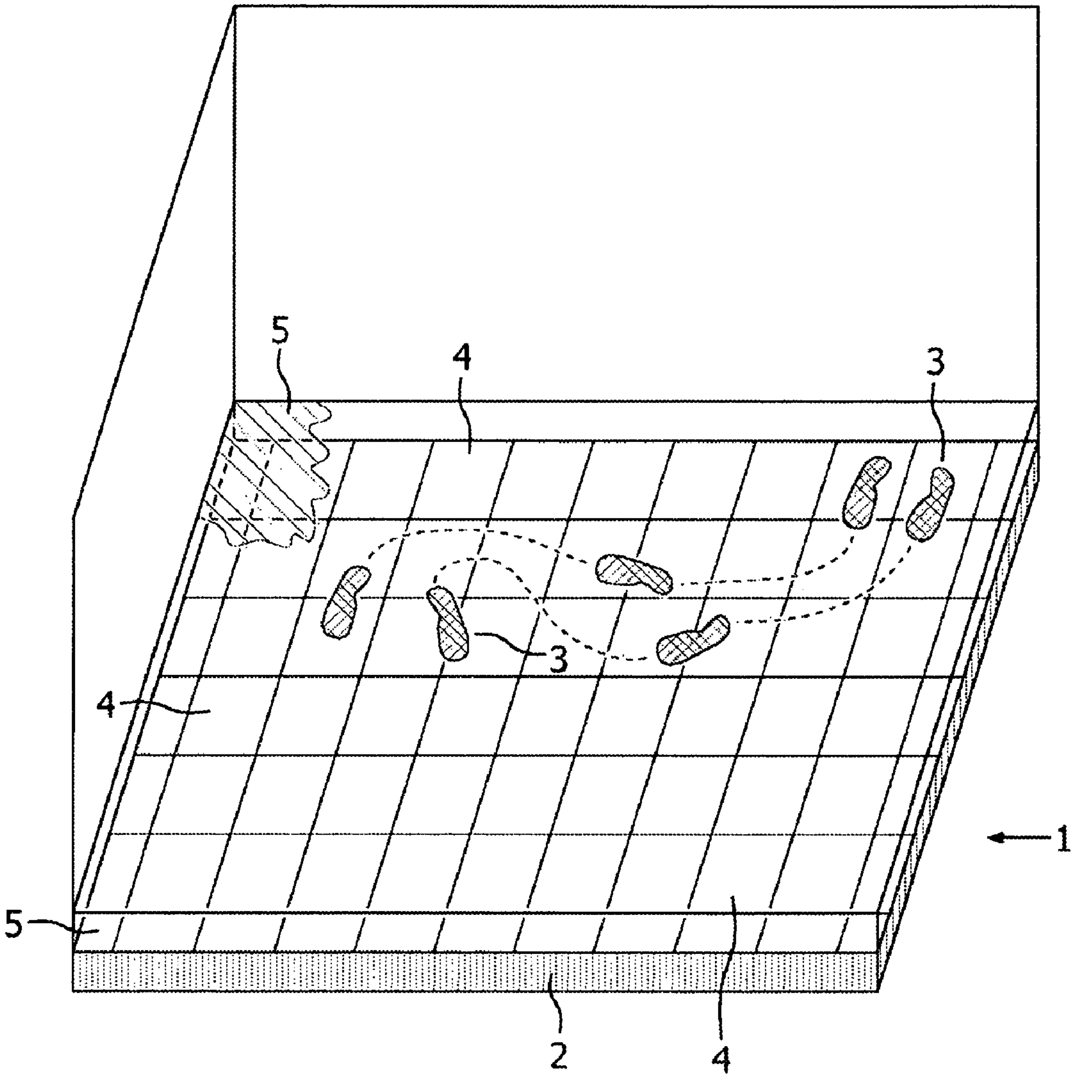
FIG. 1 shows a dancing guide floor with an integrated display system.

According to the present invention a display system for displaying multiplex information is provided, whereby an individual selection of information is individually addressed to a different user or user groups, whereby the display system for displaying multiplex information comprises at least one display panel of a plurality of light emitting dot-like means and a plurality of sensors, whereby a user or user groups are located by sensors so that individual information can be individually addressed depending on the position of each sensor-located user or user groups.

A display that can be used in a display system according to the present invention can be an LED display, preferably a matrix of LED dots such as a LED dot matrix display.

According to the present invention, the display system can comprise a plurality of display panels of a plurality of light emitting dot like means. The light-emitting dot-like means can preferably be LEDs and/or OLEDs.

The display panels can be connected to form one large display and/or a plurality of large displays.

DETAILED DESCRIPTION OF THE INVENTION

A preferred embodiment of the present invention is a display system for displaying multiplex information, whereby an individual selection of information is individually and simultaneously addressed to a different user or user groups, whereby the display system for displaying multiplex information comprises at least one display panel of a plurality of light emitting dot-like means and at least one sensor, preferably a plurality of sensors, whereby a user or user groups are located simultaneously by sensor/s so that individual information can be individually addressed depending on the position of each sensor/s-located user or user groups.

In order to individually address information to a user or user group the position of said user or user group has to be located. According to the present invention at least one sensor can be used to locate a user or user groups. A sensor can be selected from the group of radiation sensor, light sensor, photo sensor, infrared sensor, movement sensor, inductive sensor, interferometrical sensor, humidity sensor, image sensor, force sensor, optical sensor, position sensor, proximity sensor, heat flow sensor, radio frequency sensor and/or temperature sensor.

The type of sensor can be selected with respect to the intended use of the display system according to the present invention. In case of a dancing floor with an integrated display system according to the present invention sensors can be preferably selected from the group comprising radiation sensor, light sensor, photo sensor, infrared sensor, movement sensor, inductive sensor, interferometrical sensor, force sensor, optical sensor, proximity sensor, and/or temperature position sensor.

At least one sensor can be used to locate the position of a user or a user group. However, it is preferred to use a plurality of sensors. One advantage is that a position of a user can be located more accurately. Furthermore, the position of a user or user group can be tracked more easily if a plurality of sensors is used.

At least one sensor can be integrated in and/or on the display system according to the present invention. Furthermore, at least one sensor can be arranged outside of the display system. However, it is preferred that the display system comprises a plurality of sensors, whereby sensors are arranged so that they allow to track the movement of the position of at least one user or user groups over a distance, whereby information can be individually addressed to at least one user, preferably at least two user, or user groups and the individual information tracks the individually addressed user or user groups if moved.

A preferred display system according to the present invention allows that information to be individually addressed to a user. In addition, said preferred display system can address information in such a manner that the individually addressed information tracks the addressed user or user group when moved. Thus, a display system according to the present invention can, for example, function as a dancing guide, whereby the display system displays the next steps to take to a dancer or to a group of dancers, whereby the information is individually addressed. Furthermore, the information of the next dance steps follows the user, whereby the next steps to be danced is displayed to the user or group of users. The information addressed to at least one user is depending on the position detected by a sensor. The individual information addressed to the user can be easily defined by a data processing system calculated with respect to the position located by at least one sensor.

The display system according to the present invention may be improved further insofar as that information addressed to at least one user can be authorised by a specific user code. In order to obtain authorised information the user can, for example, communicate a specific user code to a display system provided with a user code-receiving unit. This allows that a user can be individually addressed by authorised information only. Most preferred is the so-called RFID technique (Radio Frequency Identification) for transmission of said specific user code from a user to the user code-receiving unit of said display system. However, the RFID technique can be used for data communication between a user and a user code-receiving unit either in one or in both directions.

A preferred embodiment of a display system according to the present invention is a person and/or traffic management system, whereby a plurality of light emitting dot-like means are arranged to individually address, depending on position of the user or user groups, individual information to each sensor-detected user or user groups, whereby the actual position of a user or user groups are calculated by means of at least one sensor, whereby said at least one sensor is integrated into the display system and/or external, whereby the individual information tracks the individually addressed user or user groups when moved. It is preferred that individual information to each sensor-detected user or user groups is simultaneously addressed.

The person and/or traffic management display system provides individual information to a user. For example, a user at an airport can be individually addressed and guided by said display system according to the present invention to the desired gate. This can be further improved by a display system with a data-receiving unit, which can individually address a user or user groups with selected information. In order to receive said information from said display system the user needs to be authorized and/or logged in. A user can be authorized and/or logged in with the display system wirelessly as described above and/or by means of an input device.

A further object of the present invention is directed at a dancing guide floor with an integrated display system to address to at least one dancer information, such as the next position to move, title of the dance and/or rhythm, whereby the display system comprises light emitting dot-like means and the display system is protected against damage which may be inflicted by a dancer by a transparent layer.

In its simplest form the dancing guide floor with an integrated display system displays information to at least one dancer, preferably a couple, a group of dancers and/or a group of couples, whereby the display system provides information on the next step to take, steps of the dance, rhythm, title and/or background information. This display system does not necessarily need a sensor or sensors to locate the user, i.e. dancer. However, it can be beneficial to locate the actual position of a dancer (user) by means of at least one sensor in order to individually address information to a dancer or a couple.

The display is preferably a matrix of a plurality of light emitting dots, such as LEDs or OLEDs. It can be preferred that the display comprises reflectors for deflecting the light at a predetermined angle. The reflectors can be arranged to emit light in at least two predetermined directions relative to the vertical light beam axis.

A display system according to the present invention can comprise a plurality of display panels, whereby the display panels comprises a plurality of light emitting dots, such as LEDs, OLDs and/or OLEDs. A display panel that can be used according to the present invention comprises a matrix of LED dots.

According to a preferred embodiment, the reflectors of a display system according to the present invention can be arranged so that groups of light emitting dots emit light in a predetermined angle different to other groups of light emitting dots, so that individual information reaches a user at different perspective view angles. This allows that a variety of different information can be addressed to user at the same position in that the user has to vary his perspective view angle with respect to said display. Further, it is possible that a variety of different individual information can be addressed for a prolonged distance separated from each other by a predetermined perspective view angle to at least one user or user groups, whereby a user can select his desired information by adjusting his perspective view angle, so that a user can track his desired information when moved.

It is further preferred that reflectors are arranged to emit light beams of groups of light emitting dots, such as LEDs or OLEDs in predetermined directions relative to the vertical axis of the light beam, whereby the reflectors angle can alternate between individual display panel with a group of light emitting dots of at least 10° angle, preferably of at least 15° angle, further preferred of at least 20° angle and more preferred of at least 30° angle, so that individual information can be addressed separated from each other at a different perspective view angle to a user.

According to a more preferred embodiment of the present invention, a dancing floor is provided based on a display system, whereby a plurality of light emitting dot-like means is arranged to individually address, depending on the position of at least one dancer, individual information, such as the next position to move, title of the dance and/or rhythm, whereby the light emitting dot-like means are protected with a transparent layer against damage inflicted by a dancer and the actual position of at least one dancer can be calculated by means of at least one sensor, whereby said at least one sensor is integrated into the dancing floor and/or external.

The display system according to the present invention can be used for practically all purposes where information should be individually addressed to at least one user.

A display system according to the present invention can in particular be used to individually address information to at least one user or user groups depending on the position of each detected user or user groups.

Furthermore, a display system according to the present invention can be used to simultaneously and individually address information to a user or user groups depending on the position of each sensor-detected user or user groups, whereby the actual position of a user or user groups is calculated by means of at least one sensor, whereby said at least one sensor is integrated into the display system and/or external, whereby the individual information tracks the individually addressed user or user groups if moved.

A further object of the present invention is directed at a process to simultaneously and individually address individual information by means of a display system according to the present invention to a plurality of users or user groups, whereby at least one user or user group is detected and located by means of at least one sensor;

information is individually addressed to a sensor-located user or user groups;

individually addressed information tracks the individually addressed user or user groups if moved; and optionally a user or user groups are identified and/or authorized by a user code so that depending on the user code the information is selected to be individually addressed to said user.

Figure 2:
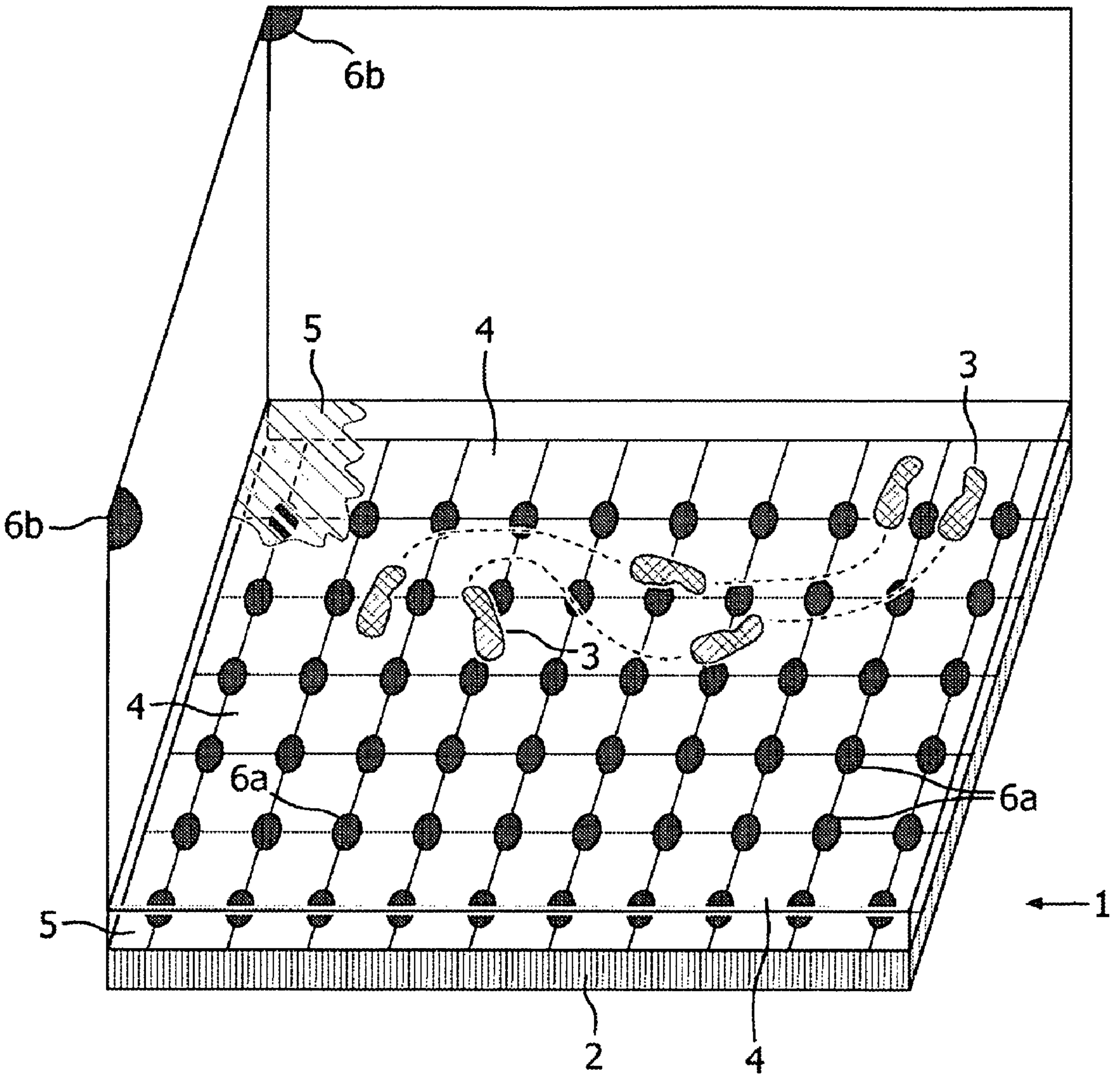
FIG. 2 shows a dancing guide floor based on a display system with sensor.

The present invention is further illustrated by the FIGS. 1 to 2.

FIG. 1 shows a dancing guide floor 1 with an integrated display system 2 to address to at least one dancer information on the next steps to move 3, whereby the display system comprises an LED matrix display 4 and the display system 2 is at least partially protected with a transparent layer 5 against damage which may caused by a dancer.

FIG. 2 shows a dancing guide floor 1 based on a display system 2, whereby an LED matrix display 4 is arranged to individually address, depending on the position of at least one dancer, individual information, such as the next step to move, whereby the LED matrix display 4 is protected with a transparent layer 5 against damage inflicted by a dancer and the actual position of at least one dancer is calculated by means of at least one sensor 6*a*/6*b*, whereby said at least one sensor 6*a* is integrated into the dancing floor and external 6*b*.

To provide a comprehensive disclosure without unduly lengthening the specification, the applicant hereby incorporates by reference each of the patents and patent applications referenced above.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A display system for displaying multiplex information, whereby an individual selection of information is individually addressed to at least one user in a user group on a guide floor, comprising:

a display system for displaying multiplex information having at least one display panel of a plurality of light emitting dot-like light emitters and at least one sensor, whereby said at least one user in said user group is located by said sensor so that individual information can be individually addressed depending on the position of each sensor-located user in said user group;

whereby said display system has at least one sensor, said at least one sensor arranged so that it is operable to track the movement of the position of each of said user in said user group over a distance on said guide floor, whereby information can be individually addressed to each of said user in said user group and the individual information tracks the individually addressed user if moved;

wherein groups of said light emitters emit light in variant predetermined angle different to other groups of said light emitters so that individual information reaches said user at different perspective view angles for allowing a variety of different information to be addressed to said user at the same position.

2. The display system according to claim 1, wherein said at least one sensor to locate said user in said user group is selected from the group comprising radiation sensor, light sensor, photo sensor, infrared sensor, movement sensor, inductive sensor, interferometrical sensor, humidity sensor, image sensor, force sensor, optical sensor, position sensor, proximity sensor, heat flow sensor, radio frequency sensor and/or temperature sensor.

3. The display system according to claim 1, whereby the light emitting dot-like light emitters are LEDs and/or OLEDs.

4. A display system for displaying multiplex information of claim 1 including said guide floor, whereby a plurality of light emitting dot-like light emitters is arranged to individually address, depending on the position of at least one dancer in said user group, individual information, such as the next position to take, title of the dance and/or rhythm, whereby the light emitting dot-like light emitters are protected by a transparent layer against damage inflicted by a dancer and the actual position of at least one dancer is calculated by means of said at least one sensor, whereby said at least one sensor is integrated in the dancing guide floor and/or external.

5. A display system for displaying multiplex information of claim 1, wherein said at least one user in said user group is detected and located by said at least one sensor;

wherein information is individually addressed to a sensor-located user in said user group;

individually addressed information tracks said individually addressed user if moved; and said user is identified and/or authorized by a user code so that depending on the user code information is selected to be individually addressed to said user.

* * * * *